United States Patent
Pi et al.

(10) Patent No.: US 8,175,610 B2
(45) Date of Patent: May 8, 2012

(54) APPARATUS, AND AN ASSOCIATED METHOD, FOR FACILITATING AIRLINK RESOURCE MANAGEMENT IN A RADIO COMMUNICATION SYSTEM

(75) Inventors: Zhouyue Pi, Irving, TX (US); Lin Ma, Irving, TX (US); Zhigang Rong, Irving, TX (US)

(73) Assignee: Nokia Corporation, Espoo (FI)

( * ) Notice: Subject to any disclaimer, the term of this patent is extended or adjusted under 35 U.S.C. 154(b) by 793 days.

(21) Appl. No.: 10/456,987

(22) Filed: Jun. 6, 2003

(65) Prior Publication Data

US 2004/0023661 A1 Feb. 5, 2004

Related U.S. Application Data

(60) Provisional application No. 60/386,820, filed on Jun. 7, 2002.

(51) Int. Cl.
*H04W 72/00* (2009.01)
(52) U.S. Cl. .......... 455/452.1; 455/450; 455/452.2; 370/329; 370/335; 370/342; 370/465; 370/468; 370/469

(58) Field of Classification Search .......... 455/450, 455/451, 452.1, 452.2, 453, 509; 370/379, 370/329, 335, 342, 465, 468, 469
See application file for complete search history.

(56) References Cited

U.S. PATENT DOCUMENTS

| | | | | |
|---|---|---|---|---|
| 6,807,426 | B2* | 10/2004 | Pankaj | 455/453 |
| 6,836,666 | B2* | 12/2004 | Gopalakrishnan et al. | 455/452.2 |
| 2002/0082033 | A1* | 6/2002 | Lohtia et al. | 455/517 |
| 2002/0147020 | A1* | 10/2002 | Iguchi et al. | 455/452 |
| 2006/0030345 | A1* | 2/2006 | Jain et al. | 455/515 |

* cited by examiner

*Primary Examiner* — Charles Appiah
*Assistant Examiner* — Mazda Sabouri
(74) *Attorney, Agent, or Firm* — Harrington & Smith

(57) ABSTRACT

Apparatus, and an associated method, for allocating radio resources in a radio communication system that provides for data communication services, e.g., reverse link communication services in which data is communicated by a mobile station to a network part of the communication system. A multi level control mechanism is provided in which a lower level radio airlink manager and an upper level radio airlink manager are used together to allocate resources to a mobile station to effectuate the communication service. Both centralized and distributed control is thereby provided.

22 Claims, 4 Drawing Sheets

APPARATUS, AND AN ASSOCIATED METHOD, FOR FACILITATING AIRLINK RESOURCE MANAGEMENT IN A RADIO COMMUNICATION SYSTEM

CROSS REFERENCE TO RELATED APPLICATIONS

The present application claims to priority of provisional patent application Ser. No. 60/386,820, filed on Jun. 7, 2002.

The present invention relates generally to a manner by which to manage radio resources allocated upon a radio airlink in a radio communication system, such as a CDMA 2000 system that provides for multiple data rate communication services, e.g., 1xEV-DV data communication services. More particularly, the present invention relates to apparatus, and an associated method, that provides multi-level airlink resource management on reverse link channels upon which data is communicated by a mobile station to a network part of the radio communication system.

Resource management provides data rate allocations for data communications upon the reverse link channels by the mobile station. The resource management is provided at hierarchical levels. The advantages of centralized higher level airlink resource management is provided at an upper hierarchical level while also providing the advantages of distributed airlink resource management at a lower hierarchical level.

BACKGROUND OF THE INVENTION

The ability to communicate data through the use of modern communication systems is a regular need of modern society. Many varied types of communication services are effectuated through the communication of data in many varied types of communication systems. And, as a result of advancements in communication technologies, new types of communication services have been, and continue to be, made possible.

A communication system includes at least a first communication station and a second communication station interconnected by way of a communication channel. Data is communicated by the first communication station, referred to as a sending station, to the second communication station, referred to as a receiving station, by way of the communication channel. Data that is to be communicated by the sending station is converted, if needed, into a form to permit the data to be communicated upon the communication channel. And, the receiving station detects the data communicated upon the communication channel and recovers the informational content thereof.

A radio communication system is a type of communication system. In a radio communication system, a radio channel, defined upon a radio air interface, forms the communication channel interconnecting the sending and receiving stations. Conventional wireline communication systems, in contrast, require the use of fixed, wireline connections extending between the communications stations upon which to define the communication channel.

A radio communication system provides various advantages in contrast to a wireline counterpart. Initial installation and deployment costs associated with a radio communication system are generally less than the costs required to install and deploy a corresponding wireline communication system. And, a radio communication system can be implemented as a mobile communication system in which one or more of the communication stations operable therein is permitted mobility.

A cellular communication system is an exemplary type of mobile radio communication system. Cellular communication systems have been installed throughout significant portion of the populated areas of the world and have achieved wide levels of usage. A cellular radio communication system is a multi-user communication system in which radio communications are provided with a plurality of mobile stations. Telephonic communication of voice and data is effectuable by way of the mobile stations. Mobile stations are sometimes of sizes to permit their convenient carriage by users of the mobile stations.

A cellular radio communication system includes network infrastructure that is installed throughout the geographical area that is encompassed by the communication system. Mobile stations operable in the cellular communication system communicate, by way of radio channels, with base stations that form parts of the network infrastructure of the communication system.

Base stations are fixed-site radio transceiver that transceive data with the mobile stations. The base stations are installed at spaced-apart locations throughout the geographical area encompassed by the communication system. Each of the base stations defines a cell, formed of a portion of the geographical area. A cellular communication system is so-called because of the cells that together define the coverage area of the communication system.

When a mobile station is positioned within a cell defined by a base station, communications are generally effectuable with the base station that defines the cell. Due to the inherent mobility of a mobile station, the mobile station might travel between cells defined by different ones of the base stations. Continued communications with the mobile station is provided through communication hand off procedures between successive ones of the base stations defining the successive ones of the cells through which the mobile station passes. Through appropriate positioning of the base stations, the mobile station, wherever positioned within the area encompassed by the communication system, shall be within communication proximity of at least one base station.

Only relatively low-powered signals need to be generated to effectuate communications between a mobile station and a base station when the base stations are suitably positioned at selected spaced-apart locations. Hand-offs of communications between the successive base stations permit continued communications without necessitating increases in the power levels at which the communication signals are transmitted. And, because the signals that are generated are all generally of low powered levels, the same radio channels are able to be reused at different locations of the cellular communication system. The frequency spectrum allocated to a cellular communication system is thereby efficiently utilized.

A cellular communication system is constructed, generally, to be operable pursuant to an operating specification of a particular communication standard. Successive generations of communication standards have been developed, and operating specifications defining their operational parameters have been promulgated. First-generation and second-generation cellular communication systems have been deployed and have achieved significant levels of usage. Third-generation and successor-generation systems are undergoing development, standardization, and, at least with respect to the third-generation systems, partial deployment.

An exemplary third-generation cellular communication system is a system that operates pursuant to the operating protocol set forth in a CDMA 2000 operating specification. A CDMA 2000 cellular communication system, constructed in conformity with the CDMA 2000 operating specification, provides for packet-based data communication services.

Various technology proposals by which to effectuate communication of packet data at high data rates in a CDMA 2000 communication system have been proposed. By transmitting data at high data rates, increased amounts of data are able to be communicated in a given time period.

The 1xEV-DV data communication service is one such proposal. And, the 1xEV-DO data communication service is another such proposal. These data communication services provide for the communication of data at any of several selected data rates. And, systems providing for such communication services are sometimes referred to as being multi rate communication systems. Other communication systems that permit data to be communicated at any of two or more different data rates are also sometimes referred to as being multi rate, or multiple, data rate systems.

In the CDMA 2000 system that provides for multiple data rate communication services, data that is to be communicated is communicated at selected data rates on reverse links. That is to say, data that is communicated by a mobile station to a network portion of the communication system is communicated upon a reverse link channel at a selected data rate.

Control over the allocation of radio resources upon at least some of the reverse link channels is carried out a network part of the communication system. Control over the allocation of the radio resources is required in a multi-user system to prevent more than one mobile station from attempting to utilize the same reverse link channels to communicate data thereon. Packet data communications, such as those effectuated pursuant to a 1xEV-DV communication service, are generally bursty in nature. That is to say, the data packets are communicated in bursts of high activity followed, for instance, by periods of little or no activity. To utilize most efficiently the radio resources in the communication system, the resources should ideally match the resource requirements of the packet data communications.

And, with respect to the CDMA 2000 system that provides for 1xEV-DV communication services, existing operating protocols do not set forth specific manners by which to allocate radio resources on the reverse airlink channels. Proposals have been set forth for adoption by regulatory bodies of manners by which to allocate the radio resources in such a system.

One general category of proposals provides for central control and allocation of the radio resources. Centralized control provides for relatively good coordination of system services and radio resource allocations from a whole system point of view. Another general category of control that has been proposed is distributed control of radio resources. When the control of the radio resources is distributed, relatively smaller scale resource allocations are provided. The use of distributed control provides allocation of radio resources with shorter delay than that required when centralized control techniques are used. And, resource allocations are able to be made on a more up-to-date knowledge basis of the required resources. During slow fading conditions, centralized resource allocation and control is sometimes a better manner by which to control the allocation of radio resources on the radio airlink. Conversely, during fast fading conditions, or when the data communications at variable bit rates of communications, distributed control of the allocation of radio resources is generally preferred.

As the communication conditions and the data that is to be communicated varies, sometimes centralized control of the allocation of radio resources would be the preferred manner of control, and, at other times, distributed control of allocation radio resources would be of greater benefit.

If a manner could be provided by which to allocate radio resources pursuant to a scheme that provides the advantages of centralized control as well as a scheme that provides the advantages of distributed control, advantageous resource allocation would be provided for both slowly changing channel conditions as well as channel conditions that rapidly change and in communications in which data rates of the data that is communicated change rapidly.

It is in light of this background information related to radio communication systems capable of communicating data at multiple data rates that the significant improvements of the present invention have evolved.

SUMMARY OF THE INVENTION

The present invention, accordingly, advantageously provides apparatus, and an associated method, by which to manage radio resources allocated upon a radio airlink in a radio communication system, such as a CDMA 2000 system, that provides for multiple data rate communication services, e.g., 1xEV-DV data communication services.

Through operation of an embodiment of the present invention, a multi-level airlink resource manager is provided for managing radio airlink resources on reverse link channels upon which data is communicated by a mobile station to a network part of the communication system. The multi-level airlink resource management performs management functions to provide data rate allocations for data communications upon the reverse link channels by the mobile station. The management provided by the multi-level airlink resource management is provided at hierarchical levels. Advantages associated with centralized higher level airlink resource management are provided while also providing the advantages associated with distributed lower level airlink resource management. Because of the multi-level, hierarchical nature of the airlink resource management, allocations of radio resources on the radio airlink are quickly made to respond to bursty traffic, thereby better optimizing utilization of radio resources on the reverse link to deliver the reverse link, data-intensive traffic. Overall system performance and maintenance of quality of service (QoS) is also provided by the airlink resource management. Resource allocation, and reallocation, responsive to abrupt channel fluctuations and traffic dynamics in a local area is provided while also providing for maintenance of performance criteria over wider areas.

The cooperative nature of the hierarchical level of the airlink resource management provides the advantages of both distributed control and centralized control while also avoiding their respective drawbacks. The advantage of reduced delay of allocation of radio airlink resources associated with distributed control is provided at the low-level resource management of the multi-level management to match resource allocations with resource needs that are potentially quick-changing. And, upper-level resource management of the multi-level resource management is provided that takes into account overall system information.

The lower-level airlink resource management function is embodied at, for instance, a radio base station of the cellular communication system. When embodied thereat, rate requests generated by mobile stations are quickly detected, and rate grants responsive to the rate requests are quickly made. When the rate requirements of the mobile stations change, and corresponding rate requests are made for changed rate allocations, the reallocations of the rate allocations are also quickly made at the management function embodied at the radio base station.

The upper-level radio airlink resource management function is embodied at, for instance, a base station controller, that controls various operational aspects of the base station at which the lower-level airlink management function is embodied. Higher-level control functions are performed by the upper-level radio airlink management function. Overall system performance and maintenance of quality of service (QoS) is provided at the higher-level radio airlink resource management function. Because the higher-level radio airlink management function is aware of communications over a wider area of the communication system than the, typically, single cell over which the radio base station has knowledge, centralized management decisions are made at the upper-level function.

In one implementation, resource allocations are made of permitted data rates at which to communicate data on a reverse link channel by a mobile station in response to a rate request generated by the mobile station. The rate request is detected at the base station, and the lower-level radio airlink manager embodied thereat. The lower level radio airlink manager selectably adjusts the requested rate and forwards the request to the base station controller and the upper level radio airlink manager embodied thereat. Additional parameters associated with the mobile station, and known at the base station, are also provided to, or otherwise maintained, at the base station controller. Scheduling operations are performed at the upper level radio airlink manager and a rate grant, partial rate grant, or rate denial, as appropriate, is formed at the upper level radio airlink manager. The rate grant, or other indication, is communicated from the base station controller to the base station, and the lower level radio airlink manager embodied thereat. The rate grant is selectably modified by the lower level radio airlink manager and forwarded on to the mobile station at which the rate request was originated.

The lower level radio airlink manager, in one implementation, modifies the rate grant in the event that during pendency of the rate request, earlier forwarded on to the base station controller, another rate request is delivered by the mobile station that was earlier submitted in the earlier rate request. If, for instance, the later submitted rate request is for a lesser amount of radio resources, i.e., a lower data rate, the rate grant is modified by the lower level radio airlink manager acts to reduce the radio resources allocated to the mobile station. In other words, if the level of resources requested in the original rate request is no longer required, the rate allocation is reduced to match the allocation with the need for the allocation.

When implemented in a CDMA 2000 cellular communication system that provides for 1xEV-DV communication services, radio airlink management functions are performed pursuant to a multi-level management scheme. Changes in data rates of the 1xEV-DV communications, and corresponding changes in rate allocation needs, are better handled due to the hierarchical nature of the management mechanism. Because of the distributed nature of the lower level radio airlink manager, changes in the rate needs are quickly acted upon to match the rate allocations with the rate needs.

In these and other aspects, therefore, apparatus, and an associated method, is provided for a radio communication system that has at least a first mobile station to which radio airlink resources are selectably allocated in response to a request therefore. Allocation of the radio airlink resources to the mobile station is facilitated. A first level airlink resource manager is adapted to receive a first resource request made by the mobile station and selectably at least a second, subsequent resource request made by the mobile station. The first level airlink resource manager obtains an upper level allocation responsive to detection of the first resource request. And, the upper level allocation is selectably altered responsive to the second subsequent resource request, to form a selectably modified allocation. The selectably modified allocation is representative of the radio airlink resources that are allocated to the mobile station.

A more complete appreciation of the present invention and the scope thereof can be obtained from the accompanying drawings, which are briefly summarized below, the following detailed description of the presently-preferred embodiments of the invention, and the appended claims.

DETAILED OF THE DESCRIPTION

Figure 1:
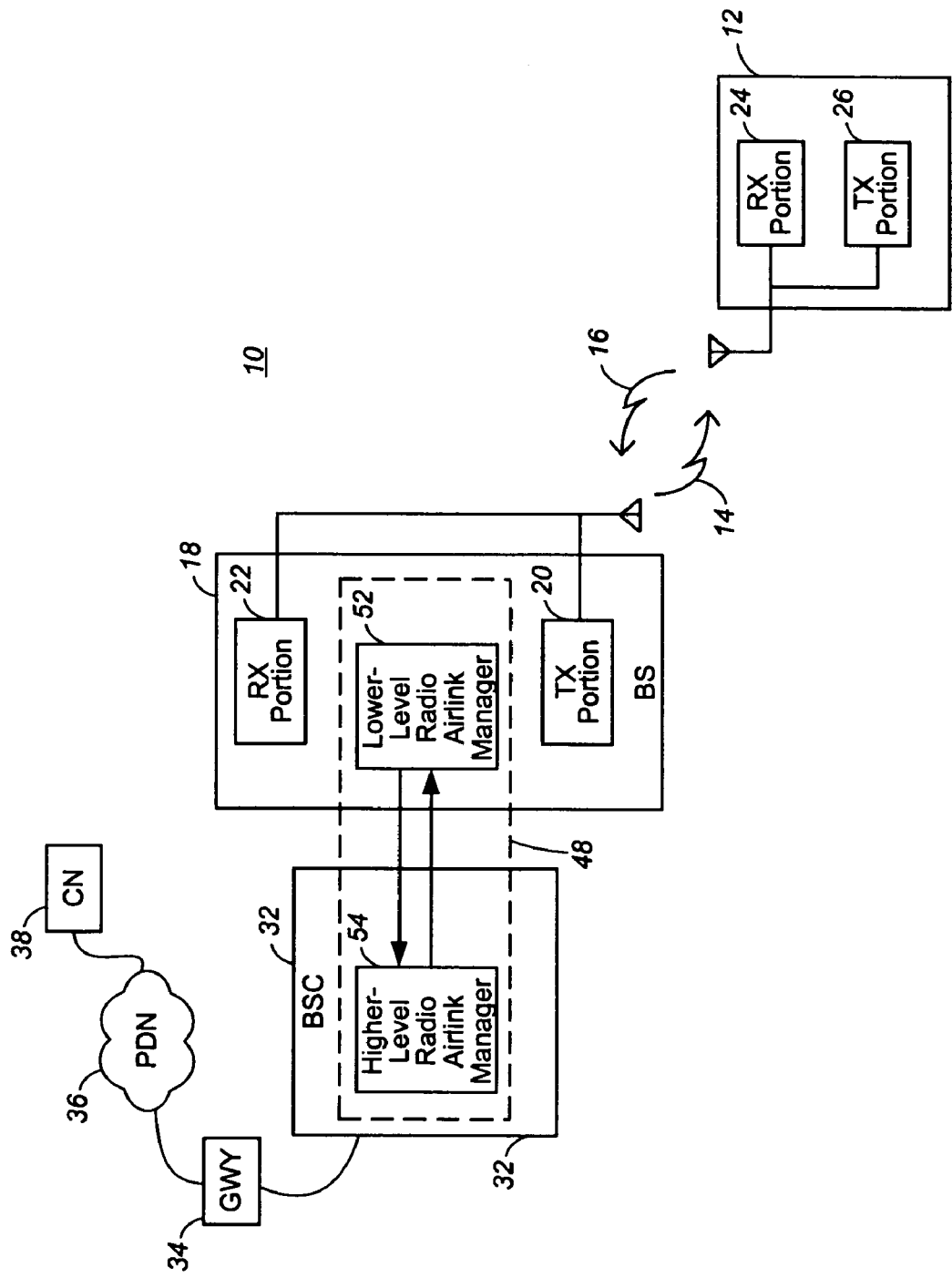
FIG. 1 illustrates a functional block diagram of a radio communication system in which an embodiment of the present invention forms a portion.

Referring first to FIG. 1, a communication system, shown generally at 10, provides for data communications with mobile stations, of which the mobile station 12 is representative. The communication system, in the exemplary implementation, operates generally pursuant to the operating protocols set forth in a CDMA 2000 operating specification that provides for multi rate data communication services, here 1xEV-DV data communication services.

While the following description of operation of the various embodiments of the present invention shall be described with respect to their implementation in a CDMA 2000/1xEV-DV communication system, the present invention is analogously also operable in other types of communication systems.

Data communications are effectuated on both a forward link extending from a network part of the communication system to a mobile station, such as the mobile station 12 and on a reverse link from a mobile station to the network part. The arrow 14 shown in the Figure is representative of the forward link and forward link channels defined thereon for communication of data from the network part of the communication station to the mobile station. And, the arrow 16 is representative of the reverse link and reverse link channels defined thereon for the communication of data by the mobile station to the network part. Channels are defined upon which to communicate both control data, i.e., control signaling, and traffic data, such as 1xEV-DV communication data.

The data channels that are defined include channels that are allocated to a communication station during a communication session so that radio resources are available to communicate the data. As the data communication system is a packet communication system, airlink resources are needed and allocated, for the periods during which data is communicated. The data is communicated at a selected data rate, and the data rate is potentially of any of several data rates. Generally, when data is communicated at a higher data rate, increased communication resources are required to permit the communication of data at the higher data rate than when data is communicated at a lower data rate.

The network part of the communication system includes a base station 18 that transceives data communicated upon the forward and reverse links 14 and 16. And, the mobile station also operates to transceive the data on the forward and reverse links 14 and 16. And, more particularly, the base station includes a transmit portion 20 and a receive portion 22, and the mobile station includes a receive portion 24 and a transmit portion 26. The portions 20-22 and 24-26 of the base station and mobile station, respectively, transmit and receive the data that is communicated upon the forward and reverse link channels.

The network part of the communication system also includes a base station controller (BSC) 32 to which the base station 18 is coupled. The base station controller, in turn, is coupled to a gateway (GWY) 34 that forms a gateway to a packet data network (PDN) 36. And, a correspondent node (CN) 38 is coupled to the packet data network. The correspondent node is representative of a communication node that forms an ultimate source or destination of data communicated with the mobile station 12.

When data is to be communicated, such as pursuant to a 1xEV-DV communication service, by the mobile station upon a reverse link channel 16, a rate request is generated by the mobile station and communicated to the network part of the communication system. The network part of the communication system includes apparatus 48 of an embodiment of the present invention that operates to act upon the rate request and selectably to grant the rate request allocation. The apparatus includes a first portion, a low level radio airlink manager 52 and a higher level radio airlink manager 54. The elements 52 and 54 are hierarchically arranged such that the lower level airlink manager is embodied at the base station while the higher level radio airlink manager 54 is embodied at the base station controller or elsewhere functionally positioned hierarchically position above the base station. The apparatus 48 operates to act upon the rate requests generated by the mobile station for rate allocations of communication resources on the reverse link to communicate the data.

By positioning the elements 52 and 54 at the different layers of the network infrastructure, the separate elements operate in manners that provide the separate advantages of distributed control and centralized control. At the higher level radio airlink manager 54, control is effectuated to control the overall system performance and to maintain quality of service levels over a wide area while the lower level radio airlink manager exerts control in a manner better to respond to abrupt channel fluctuations and traffic dynamics.

Figure 2:
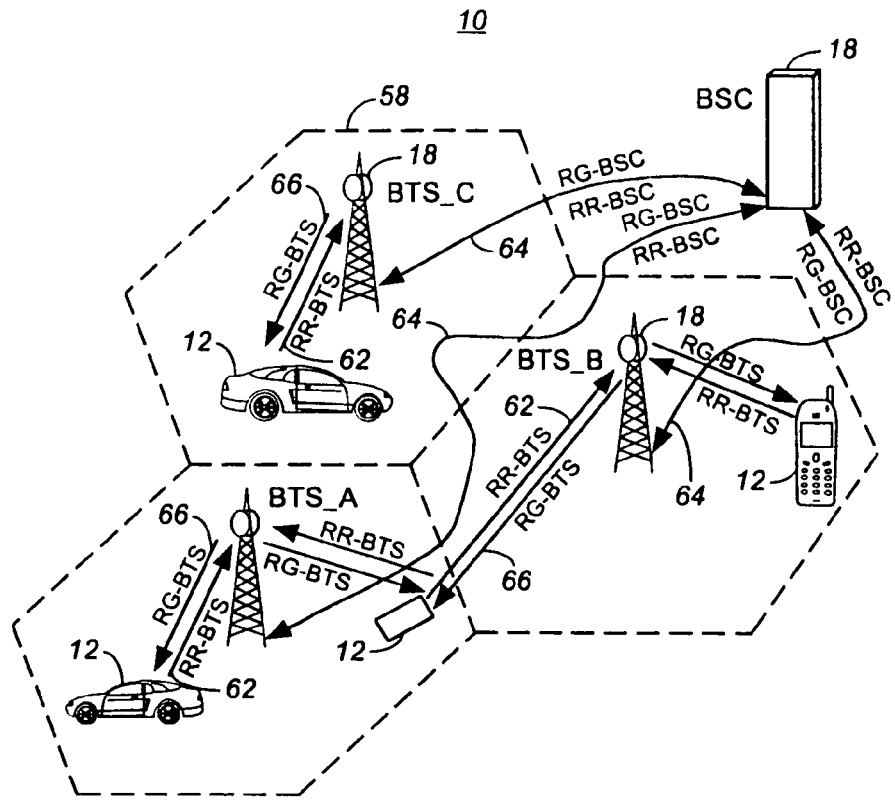
FIG. 2 illustrates a representation of the radio communication system shown in FIG. 1, here illustrating various signaling between various exemplary mobile stations operable in the radio communication system pursuant to communication operations therein.

FIG. 2 illustrates exemplary operation of the communication system 10 during operation to allocate radio airlink resources on reverse link channels, here to permit the effectuation of 1xEV-DV communication services by mobile stations. In the illustration, a plurality of mobile stations 12 are represented. And, three base stations 18 are represented, each of which is coupled to the base station controller 18. Each of the mobile stations is capable of transmitting communication data upon reverse link channels to effectuate a communication service at a selected data rate. Cells 58 are associated with, and defined by, a base station 18. When a mobile station 12 is positioned within a cell, or other coverage area, defined by a base station 18, the mobile station communicates with that base station. While, for purposes of illustration, only one packet data service is requested and carried out by a mobile station at any one time. However, more generally, multiple data services per mobile station are also possible.

When data is to be communicated by a mobile station to effectuate a communication service, a rate request, here identified by the RR-BTS arrows 62, are generated and transmitted to an associated radio base station. The contents of the rate requests are based upon application characteristics, buffer status, and available transmission power levels, amongst other indicia, for a certain data rate at which the mobile station would like to transmit data in a following one or several frames.

When the base station, i.e., base station in the active set of the mobile station, receives the rate request, adjustments are made, if necessary, at the lower level radio airlink manager thereof (shown in FIG. 1), and the rate request is forwarded, indicated by the designations RR-BSC of the arrows 64, to the base station controller. The base station also informs the base station controller of other parameters that are necessary for the base station controller to perform accurate, centralized airlink resource management at the higher level radio airlink manager thereof (also shown in FIG. 1). For example, the base station controller is preferably provided with information associated with the current data rate allocated to the mobile station, the received power from the mobile station at each base station in the active set associated with the mobile station, and a rise over thermal (ROT) level at each base station.

Scheduling is performed at the base station controller responsive to each received request, and rate grants are allocated, and communicated, designated by the RG-BSC indications, also on the arrows 64, are returned to the appropriate base station 18. In one implementation, the base station controller also transmits the priorities of the mobile station to the appropriate base station.

A base station 18 receives rate grants from the base station controller for all of the mobile stations that are currently communicating therewith. The base station also receives up to date rate requests from the mobile stations. That is to say, the base station might also receive a rate request subsequent to the earlier transmitted rate request and responsive to which the base station controller generates the rate grant. The lower level radio airlink manager (shown in FIG. 1) at the base station incorporates the information of the subsequent rate requests and makes adjustments to the rate grants and generates new rate grants, indicated by the arrows 66, that are transmitted to the mobile stations 12.

Figure 3:
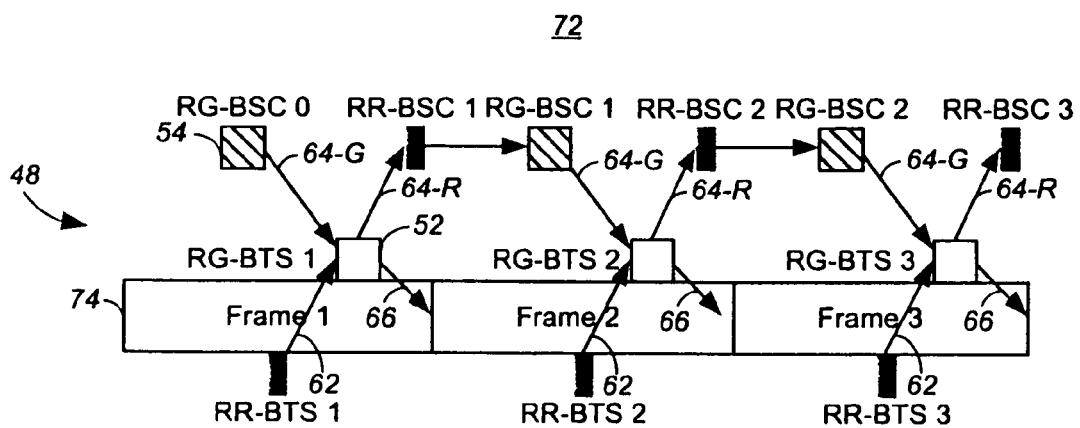
FIG. 3 illustrates a representation of operation of the multi level radio airlink manager of an embodiment of the present invention in an exemplary implementation in which data frames communicated pursuant to a communication session are of relatively large lengths.

FIG. 3 illustrates a representation, shown generally 72, of operation of the lower and higher level airlink managers 52 and 54 of the apparatus 48 of an embodiment of the present invention during communication operations in which relatively lengthy frames 74 are communicated to effectuate a communication service. Here, the frame lengths are of exemplary 20 ms lengths. And, rate requests 62 generated by a mobile station are sent in the middle portion of the frames 74. And, here, the delay of the upper level centralized airlink resource manager is defined as a roundtrip time between the time instant when the mobile sends the rate request 62 and the time instant when the mobile station receives a rate grant from the higher level airlink manager. And, delay of the lower level manager is defined as the roundtrip time between the time instant when the mobile station sends the rate request and the time instant when the mobile station receives a rate grant from the manager 52 embodied at the base station, assuming no interaction with the upper level manager.

As the lower level base station has the latest rate request information sent by a mobile station, a reasonable lower level rate grant algorithm used in an exemplary implementation of the present invention guarantees the performance of the multi level manager to be better, or at least equal to, the performance of the original centralized scheduling algorithm only.

The Figure also shows the rate requests and rate grants forwarded to, and returned from, designated by 64-R and 64-G, the higher level radio airlink manager.

Figure 4:
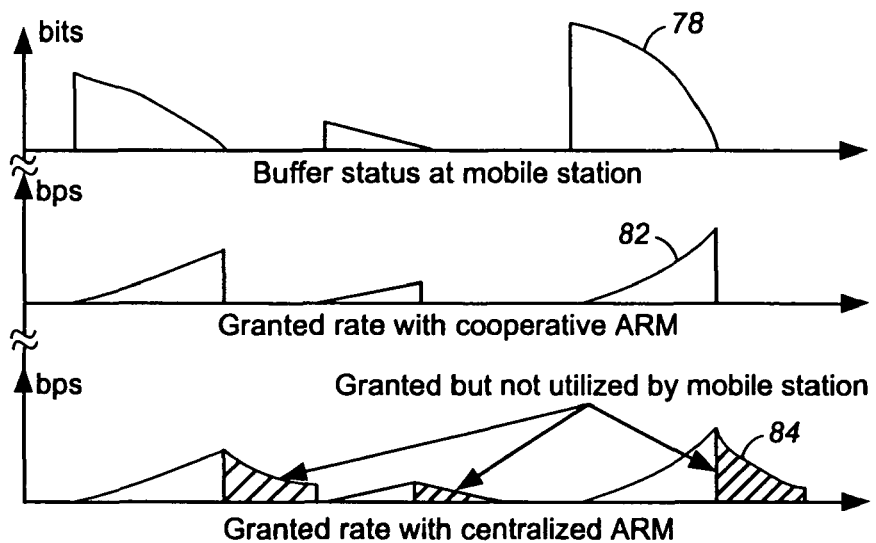
FIG. 4 illustrates graphical representations of the behavior of the multi level cooperative airlink resource management provided pursuant to an embodiment of the present invention and corresponding behavior of a system that, instead, utilizes only centralized airlink resource management mechanisms.

FIG. 4 illustrates graphical representations of plots 78, 82, and 84. The plots illustrate the behavior of multi level cooperative airlink management of an embodiment of the present invention, together with use of merely, centralized management in operation to effectuate communication of short, bursty traffic. Use of merely centralized management experiences longer roundtrip delays than distributed management. The delay varies, for instance, between several tens of milliseconds to more than one hundred milliseconds, depending upon the protocol, capacity, and load of the connections between the base station and base station controller at which the multi level management mechanism is embodied. When the data communicated upon the reverse link carries short and bursty traffic, centralized management is often not quick enough to respond to the traffic dynamics. The plot 78 represents exemplary buffer status at the mobile station. When the buffer at the mobile station drains out, it takes the time of about one or several frames for the information to arrive at the base station controller. In the meantime, the manager embodied at the base station controller shall keep allocating resources for the mobile station, although the mobile station does not utilize the resource, as no data remains in the buffer.

When multi level, cooperative radio airlink management is provided pursuant to an embodiment of the present invention, when the rate grant arrives at the base station, the base station also has the latest knowledge of the rate request from the mobile station. The mobile station is able to stop allocating resources for the mobile station immediately, and to reallocate the resources to other mobile stations. The other mobile stations are those mobile stations that are requesting data rates that are higher than the rate granted by the base station controller. With a proper physical layer signaling design, unnecessary allocations of resources can be completely avoided.

Also, as the upper level manager embodied at the base station controller maintains overall system information and is able to coordinate the manager embodied at the base station to perform lower level management functions, the performance of the multi level manager is better than, or at least equal to, the performance utilizing only distributed management functions.

When only distributed management functions are provided, the resource allocation at the base station level is not coordinated because the base station does not have knowledge of resource allocations and rise over thermal levels other base stations. As a result, the fluctuation of actual received ROT levels is high. If, for instance, several neighboring cells happen to allocate resources to several mobile stations at around the same region, and at the same time, the actual received values of the rise over thermal levels at neighboring base stations might overshoot over the nominal upper limit of the ROT permitted values. This is a critical measure for maintaining the system running with reasonable levels of loading. On the other hand, soft handoff users might not be granted the same rate for all base stations in an active set at the same time. In this case, typically, the mobile station maintains the received ROT level at the base station and, hence, underutilizes the radio resources.

In the multi level management scheme provided pursuant to an embodiment of the present invention, the base station controller has the overall knowledge to maximize resource utilization without causing overshoot of the ROT. This guarantees that the ROT shall be maintained at a reasonably stable level, while lower level management mechanism functionality at the base station refines the resource allocation with the assistance of the latest information about the channel conditions and traffic dynamics. The adjustments made by the mobile station are conservative in the sense that the adjustments to overwrite rate grants from the upper level manager unless the rate grants are not appropriately based on the latest received requests from the mobile station. As the scheduling is performed for all of the mobile stations in the system, and the base station's share this information, it is more likely for different base stations to synchronize their rate grants. The likelihood of underutilization of resources decreases.

Figure 5:
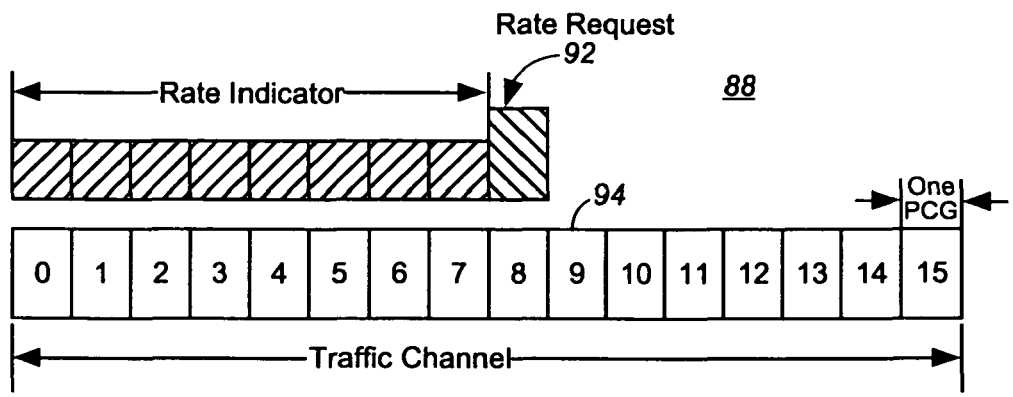
FIG. 5 illustrates a representation of an exemplary channel structure that supports the multi layer cooperative airlink resource manager of an embodiment of the present invention.

FIG. 5 illustrates an exemplary channel structure 88 that is used pursuant to an embodiment of the present invention. Here, the frame is relatively lengthy, e.g., 20 ms in length. A rate request 92 is transmitted at a latest time slot of the time slots 94 that permit a rate grant to be applied at a subsequent frame. In this example, the delay for higher level management functions performed at the base station controller is 30 ms, and the delay for lower layer management, performed by the base station is 10 ms.

Figure 6:
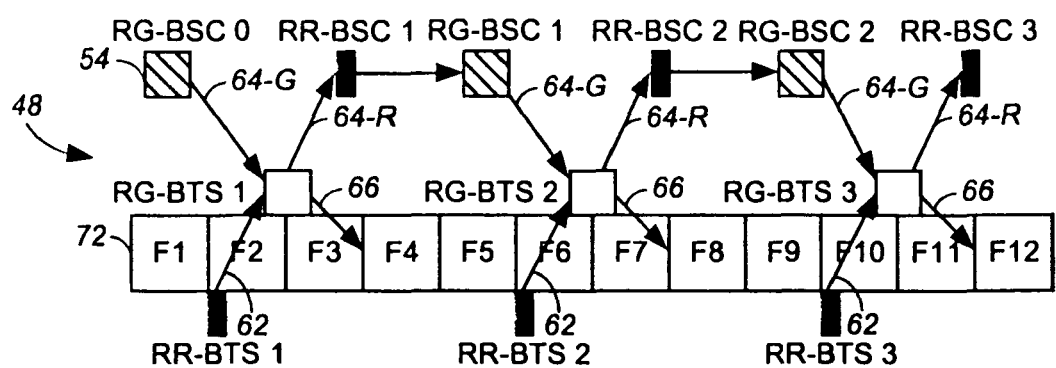
FIG. 6 illustrates a representation, similar to the representation shown in FIG. 3, but here to represent operation of the airlink resource manager of an embodiment of the present invention when data frames communicated pursuant to effectuation of a communication service are of relatively short lengths.

FIG. 6 again illustrates exemplary operation of the apparatus 48 when the frames 74 of data that is communicated to effectuate a communication service is of relatively short frame lengths. Again, rate requests 62 are generated by a mobile station and are communicated to the lower level manager 52 embodied at a radio base station. The rate requests and rate grants forwarded on by, and returned to, the base station are designated by the arrows 64-R and 64-G. The multi level mechanism is also operable ably to control resource allocations when the frame lengths are short.

Interfacing between the base station and base station controller at which the managers 52 and 54 are embodied are preferably properly designed for the base station to forward on the rate requests 64-R and other information required by the manager 54 and for the base station controllers and the rate grants, indicated by the arrows 64-G, and mobile station priority information to the base station.

In the exemplary implementation, the managers 52 and 54 embodied at the base station and base station controller, respectively, comprise algorithms executable by processing circuitry. As such, the managers are flexibly implemented of any of various specific types of operation to adapt to system characteristics and limitations. In one implementation, at the higher level manager, a proportional fair scheduling algorithm is used. At each scheduling period, calculations are made of the priority for each mobile station based upon the quality measure, the rate request, the allocated data rate, and the received power from the mobile stations. Then, the mobile stations are sorted by their priorities, with resources first allocated to the mobile stations with highest priorities. The priority of the n-th mobile station at times k is:

$$S_n(k) = \frac{1}{\sum_{i=1}^{M} P_{n,i}(k)/P_{n,1}(k)} \left[\frac{R_{n,r}(k)}{Q_n(k)R_{n,a}(k)}\right]^{1/\alpha} \forall n, \forall k,$$

wherein:

$R_{n,r}(k)$ is the rate request received from the n-th user at time k;

$R_{n,a}(k)$ is the average rate allocated until the time k to the n-th user;

$Q_n(k)$ is the quality of service measure until time k to the n-th user;

$P_{n,1}(k)$ is the received pilot power for the I-th base station in the active set of the n-th mobile station;

$P_{n,1}(k)$ is the largest received pilot power amongst all of $N_{n,1}(k)$; and alpha is an adjustable fairness factor.

Starting from the mobile station that has the highest priority level, the base station controller makes rate grants based upon the rate requests and the available ROT. Mobile stations with the higher priority levels are assigned with the highest possible rates up to the rate requested as long as the ROT level does not exceed a proper threshold.

In an exemplary implementation, the lower level algorithm consists of two steps. First, after reception of the rate grant from the base station controller, the base station compares all of the latest rate requests with the rate grant. And, a new rate grant is generated:

RG_BTS=min(RG_BSC,RR_BTS).

The base station also updates the predicted ROT level with the new rate grants. If the updated ROT is lower than a proper threshold, the base station reallocates resources to the mobile stations with: RR_BTS greater than RG_BSC starting from the mobile station having the highest priority level.

If the updated ROT level is higher than the proper threshold, the base station lowers the rate grant to the mobile stations until the predicted rate over thermal level is lower than, or equal to, the proper threshold, starting from the mobile station exhibiting the lowest priority. The priority information is obtained from the base station controller.

As noted above, other algorithms, and variations to these algorithms, can instead be used. For example, the base station controller can do only scheduling without any resource allocation. And, the lower level mechanism performs resource allocation with the common scheduling information obtained from the base station controller. In the event that the delay is not optimized, the criteria of resource management at two distinct layers can be different. For instance, the upper level mechanism can focus on long term traffic loading and prioritize support of QoS for different services, while the lower level mechanism handles radio resource allocation and ROT control.

Thereby, a multi level mechanism by which to allocate resources in a radio communication system is provided. Because of the multi level nature of the mechanism, advantages of both centralized and distributed control is provided.

The preferred descriptions are of preferred examples for implementing the invention, and the scope of the invention should not necessarily be limited by this description. The scope of the present invention is defined by the following claims.

We claimed:

1. An apparatus comprising:
   a first layer airlink resource manager configured to receive a first data rate request for a transmission made by a mobile station and selectably at least a second, subsequent data rate request for the transmission made by the mobile station, said first level airlink resource manager being configured to obtain an upper level allocation responsive to detection of the first data rate request and to selectably alter the upper level allocation responsive to the second subsequent data rate request without a subsequent allocation value being provided thereto, to form a selectably modified allocation, the selectably modified allocation representative of the radio airlink resources allocated to the mobile station; and
   a second level resource manager for forming the upper level allocation, said second level resource manager being positioned hierarchically above said first level resource manager.

2. The apparatus of claim 1 wherein the radio communication system includes a network part having at least a first base transceiver station and wherein said first level air resource manager is embodied at the at least the first base transceiver station.

3. The apparatus of claim 2 wherein the at least the first base transceiver station comprise the first base transceiver station and at least a second base transceiver station and wherein said air resource manager is embodied at least at each of the first and the second base transceiver stations.

4. The apparatus of claim 2 wherein the network part of the radio communication system further comprises a base station controller, the base station controller functionally positioned hierarchically upon the at least the first base transceiver station, and wherein the upper level allocation obtained by said first level air resource manager is provided by the base station controller.

5. The apparatus of claim 4 further comprising the second level resource manager embodied at said base station controller, said second level resource manager being configured to form the upper level allocation.

6. The apparatus of claim 5 wherein the radio communication system comprises a multi user communication system, wherein at least the first mobile station comprises a plurality of mobile stations and wherein the upper level allocation is made responsive to resources requested by the plurality of mobile stations, the upper level allocation selectably allocating to selected ones of the mobile station's resource allocations according to a selected allocation scheme.

7. The apparatus of claim 6 wherein each mobile station of the plurality of mobile stations has a priority associated therewith, and wherein the resource allocations made by said second level airlink resource manager to the selected ones of the mobile stations are dependent, in part, upon priorities associated with the selected ones of the mobile stations.

8. The apparatus of claim 1 wherein the first data rate request is generated at a first time, wherein the second data rate request is selectably generated at a second time, and wherein the upper level allocation is selectably altered if said first level airlink resource manager obtains the upper level allocation prior to reception of the second data rate request.

9. The apparatus of claim 8 wherein said first level airlink resource manager alters the upper level allocation if the second data rate request is for a lesser allocation than the upper level allocation.

10. The apparatus of claim 9 wherein said first level airlink manager performs a logical minimum operation upon the data rate corresponding to the upper level allocation and the second data rate request.

11. A method comprising:
- delivering a first data rate request, for resource allocation for a transmission to a first mobile station, to a first level airlink resource manager;
- providing indications of the first data rate request to a second level airlink resource manager positioned hierarchically above the first level airlink resource manager;
- allocating, at the second level airlink resource manager, a second level allocation of airlink resources for the transmission to the mobile station;
- forwarding indications of the second level allocation to the first level airlink resource manager;
- delivering a second data rate request to the first level airlink resource manager; and
- selectably altering, at the first level airlink resource manager, the second level allocation of the airlink resources if the indications of the second level allocation are received subsequent to delivery of the second data rate request to the first level airlink resource manager by at least a selected period and no subsequent allocation value is provided thereto.

12. The method of claim 11 wherein the second level allocation of the airlink resources are altered during said operation of selectably altering if the second data rate request is for a resource allocation of an amount less than the second level allocation.

13. The method of claim 11 wherein the radio communication system comprises a network part, the network part having a base transceiver station and a base station controller, and wherein the first level airlink resource manager to which the first data rate request is delivered during said operation of delivering is embodied at the base transceiver station.

14. The method of claim 13 wherein the second level airlink resource manager at which said operation of allocating is performed is embodied at the base station controller.

15. The method of claim 11 further comprising the operation of communicating to the mobile station indications of a selected one of the second level allocation and the second level allocation, once altered during said operation of selectably altering.

16. The method of claim 11 wherein the first data rate request, delivered during said operation of delivering, comprises a request for reverse link resource allocation upon which to communicate data by the mobile station.

17. The method of claim 11, wherein the second level allocation of airlink resources is allocated to the mobile station at least in part upon a rise over thermal level.

18. The method of claim 12, wherein the second level allocation of airlink comprises:
- updating a predicted rise over thermal level, and
- if the predicted rise over thermal level exceeds a predetermined threshold, further selectably altering the second level allocation of airlink resources.

19. The method of claim 11, wherein the second level allocation of airlink resources is allocated to the mobile station at least in part upon an assigned priority of the mobile station for a nth user, wherein the assigned priority at a time k is $$S_n(k) = \frac{1}{\sum_{i=1}^{M} P_{n,i}(k)/P_{n,\alpha}(k)} \left[ \frac{R_{n,r}(k)}{Q_n(k)R_{n,\alpha}(k)} \right]^{1/\alpha} \forall_n, \forall_k ,$$

wherein $R_{n,r}(k)$ is the rate request received from the n-th user at time k; $R_{n,r}(k)$ is the average rate allocated until the time k to the n-th user; $Q_n(k)$ is the quality of service measure until time k to the n-th user; $P_{n,1}(k)$ is the largest received pilot power for the I-th base station in the active set of the n-th mobile station; $P_{n,1}(k)$ is the largest received pilot power amongst all of $N_{n,1}(k)$; and α is an adjustable fairness factor.

20. The apparatus of claim 1, wherein the selectably modified allocation representative of the radio airlink resources is allocated to the mobile station at least in part upon a rise over thermal (ROT) level.

21. The apparatus of claim 9, wherein the selectably modifying the allocation representative of the radio airlink resources includes:
- updating a predicted rise over thermal level, and
- if the predicted rise over thermal level exceeds a predetermined threshold, selectably adjusting the allocation representative of the radio airlink resources allocated to the mobile station.

22. The apparatus of claim 1, wherein the upper level allocation is allocated at least in part upon an assigned priority of the mobile station for a nth user, wherein the assigned priority at a time k is $$S_n(k) = \frac{1}{\sum_{i=1}^{M} P_{n,i}(k)/P_{n,\alpha}(k)} \left[ \frac{R_{n,r}(k)}{Q_n(k)R_{n,\alpha}(k)} \right]^{1/\alpha} \forall_n, \forall_k ,$$

wherein $R_{n,r}(k)$ is the rate request received from the n-th user at time k; $R_{n,r}(k)$ is the average rate allocated until the time k to the n-th user; $(Q_n(k)$ is the quality of service measure until time k to the n-th user; $P_{n,1}(k)$ is the received pilot power for the I-th base station in the active set of the n-th mobile station; $P_{n,1}(k)$ is the largest received pilot power amongst all of $N_{n,1}(k)$; and α is an adjustable fairness factor.

* * * * *